United States Patent
Casado Montero et al.

(10) Patent No.: US 9,481,474 B2
(45) Date of Patent: Nov. 1, 2016

(54) AUXILIARY POWER UNIT WITH INTEGRATED FIRE DETECTION SYSTEM

(71) Applicant: Airbus Operations, S.L., Getafe (Madrid) (ES)

(72) Inventors: Carlos Casado Montero, Getafe (ES); Maria Cruz Zamarro Martin, Getafe (ES); Pio Fernandez Lopez, Getafe (ES)

(*) Notice: Subject to any disclaimer, the term of this patent is extended or adjusted under 35 U.S.C. 154(b) by 0 days.

(21) Appl. No.: 14/583,832

(22) Filed: Dec. 29, 2014

(65) Prior Publication Data

US 2015/0183524 A1 Jul. 2, 2015

(30) Foreign Application Priority Data

Dec. 27, 2013 (EP) ..................................... 13382568

(51) Int. Cl.
| | |
|---|---|
| H02B 1/26 | (2006.01) |
| B64D 45/00 | (2006.01) |
| B64D 41/00 | (2006.01) |
| F02C 6/00 | (2006.01) |
| F02C 7/20 | (2006.01) |
| F16H 57/02 | (2012.01) |
| G01K 1/14 | (2006.01) |
| G01K 13/00 | (2006.01) |

(52) U.S. Cl.
CPC ............... *B64D 45/00* (2013.01); *B64D 41/00* (2013.01); *F02C 6/00* (2013.01); *F02C 7/20* (2013.01); *F16H 57/02* (2013.01); *G01K 1/14* (2013.01); *G01K 13/00* (2013.01); *B64D 2041/002* (2013.01); *B64D 2045/009* (2013.01); *F05D 2220/50* (2013.01); *F05D 2240/90* (2013.01); *F05D 2260/83* (2013.01); *Y02T 50/44* (2013.01); *Y10T 74/2186* (2015.01)

(58) Field of Classification Search
CPC ......... B64D 41/00; B64D 45/00; F02C 6/00; F02C 7/20; G01K 13/00; G01K 7/14
See application file for complete search history.

(56) References Cited

U.S. PATENT DOCUMENTS

| | | | | |
|---|---|---|---|---|
| 7,469,545 | B2 * | 12/2008 | Riley .................... | B64D 41/00 244/53 B |
| 2008/0245051 | A1 * | 10/2008 | Skelton .................. | F01D 21/12 60/39.83 |
| 2012/0312023 | A1 | 12/2012 | Ertz et al. | |
| 2013/0015291 | A1 | 1/2013 | DeDe et al. | |
| 2013/0091850 | A1 | 4/2013 | Francisco | |

FOREIGN PATENT DOCUMENTS

EP    2546148    1/2013

OTHER PUBLICATIONS

European Search Report, May 16, 2014.

\* cited by examiner

*Primary Examiner* — Gregory Thompson
(74) *Attorney, Agent, or Firm* — Greer, Burns & Crain Ltd.

(57) ABSTRACT

An Auxiliary Power Unit ("APU") for an aircraft with reduced weight, but which at the same time meets all fire-related airworthiness standards. The APU comprises a metallic housing having mounts for attaching the housing to an external structure. The APU further comprises at least one temperature sensor suitable for detecting temperature under fire conditions. The temperature sensor is coupled with the mounts for sensing temperature at the housing.

13 Claims, 2 Drawing Sheets

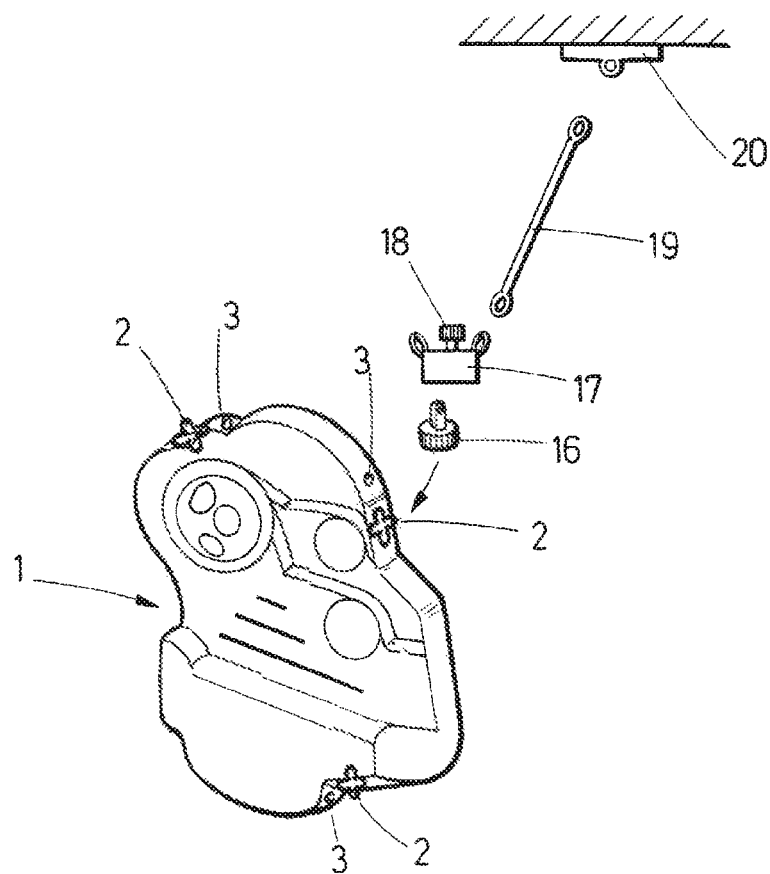
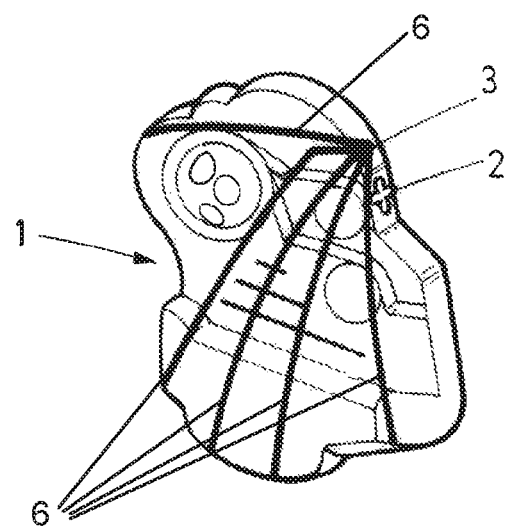

AUXILIARY POWER UNIT WITH INTEGRATED FIRE DETECTION SYSTEM

CROSS-REFERENCES TO RELATED APPLICATIONS

This application claims the benefit of the European patent application No. 13382568.7 filed on Dec. 27, 2013, the entire disclosures of which are incorporated herein by way of reference.

BACKGROUND OF THE INVENTION

The present invention relates to an Auxiliary Power Unit ("APU") for an aircraft with reduced weight, but which at the same time meets all fire-related airworthiness standards. More particularly, the invention refers to an APU with integrated sensing means for detecting temperature under fire conditions.

Another object of this invention is to provide an APU that complies with the standards and safety requirements for APUs and their housings, especially for maintaining them available and securely attached to the aircraft body in the event of a fire.

Another object of this invention is to provide an APU system with faster response against fire, when a fire occurs in the APU compartment.

An APU in an aircraft is a small turbine engine designed to provide electrical, hydraulic or pneumatic power with compressed air, mainly when the main engines of the aircraft are not running. The APU provides electrical power and pressurized air for the pneumatic systems and typically feeds the air conditioning system, the main engine starting system and the anti-ice system of an aircraft.

Because it can be an essential and an auxiliary component, the APU must meet stringent airworthiness standards that ensure that the APU is safe in any condition. For this purpose, airworthiness regulations set the specifications needed for complying with the certification requirements in order to satisfy a safe APU, those requirements under fire conditions among others.

Traditionally, the certification requirement specified a fireproof APU. Special attention is paid in critical areas considered as the most likely areas to start up or suffer a fire, such as the combustion chamber of the APU or areas where flammable fluid could be accumulated. So, in addition both APU and its compartment were conventionally surrounded by a detector wiring which routed around the critical areas of the APU and its compartment for detecting temperature, acting as a fire detection system. Typically, the detecting wire detects temperature increase through pressure variation and is lead to an electrical signal transducer, which feeds a fire detection unit for triggering a fire detection alarm when the pressure variation exceeds a pre-established threshold. For illustrative purpose, FIG. 1 shows the detector wiring 4 routing along the APU compartment 8. In addition the APU machine must satisfy stringent requirements for its relevant qualification. This qualification obliges to demonstrate that the APU is safe under a fire condition. This must be demonstrated either by construction or by protection. If chosen the first option, the manufacturer must demonstrate typically by testing on many parts with a standardized flame and time duration.

APU parts and components are designed according to the temperature that they will have to withstand in normal operating conditions. Therefore, the combustion chamber of the APU is in most part or in its entirety made of steel or similar material that withstand very high temperatures, which is fireproof of itself, whereas, for instance, the gearbox housing of the APU is made of aluminum.

Since the front part of the APU, particularly the gearbox housing, typically includes mounts through which the APU is attached to the APU compartment, the integrity of said mounts has to be ensured in order to avoid the loss of the APU attachment to its compartment in the event of a fire.

To solve this problem, there are known solutions that comply with the fireproof certification requirement for the entire APU based on structural reinforcing solutions.

Complying with the requirement entails more difficulty when the gearbox housing is made of aluminum or its alloys, since the risk of failure increases. One solution involves using a stronger material for the housing, thereby, the gearbox housing will be able to withstand a fire for a longer time. However, this solution implies an undesirable increase of weight and might entail a gearbox housing re-designed, which often used aluminum alloy to reduce the overall weight of the APU.

Other solutions address the weak configuration problem with the inclusion of ancillary pieces to the APU. Usually, these ancillary pieces are made of steel, titanium or fireproof-type materials and consist of brackets or rings. These pieces strengthen the support of the APU to the aircraft and carry loads from the gearbox. Nevertheless, although this type of solutions results in a reinforced APU assembly allowing APU to better withstand fire conditions, the solution comes with the drawback of the weight addition.

SUMMARY OF THE INVENTION

The present invention overcomes the drawbacks above mentioned by providing an auxiliary power unit, which achieves a weight reduction, and at the same time provides an APU that meets the safety requirements for APU availability and fire withstanding purposes.

In one aspect of the invention, the auxiliary power unit for an aircraft comprises a metallic housing having mounts for attaching the housing to an external structure, wherein the auxiliary power unit further comprises at least one temperature sensor suitable for detecting temperature under fire conditions. Said temperature sensor is coupled with said mounts for sensing temperature at the housing. Thus, the invention meets the safety requirements providing a solution based on detection. In this way, the invention provides a fireproof fire detection system wherein the temperature sensor is able to sense temperature under fire conditions. This fireproof condition ensures the fire detection operation as the sensor is located at fire risk zones.

In any event, for purposes of describing the invention, the mounts may additionally comprise a portion of the APU housing that is adjacent to the mounts, wherein this adjacent portion is at a distance lower than one third of the longer dimension of the APU housing with respect to the own mounts.

As well, for external structure, it should be understood as the aircraft airframe, its skin, body or any rigid structure of the aircraft involved in the APU attachment.

For coupling, it should be understood as any physical assembly through which the temperature sensor is thermally coupled with the mounts, either directly or indirectly, provided that the sensor is able to sense the temperature of the housing being placed at said mounts.

In this way, a technical effect and advantage of the invention is that an auxiliary power unit for an aircraft is provided, wherein the ancillary pieces and the reinforcements in some of its integral components or in its housing, can be removed or avoided. Thereby, the invention provides an APU that enables a reduction in weight, as the APU housing is used as a thermal conductor to transmit temperature from any zone of the housing to the temperature sensor. In this way, the APU housing acts as an extension of the temperature sensor to sense temperature at a larger volume. Necessarily, the APU housing has to be metallic, and, preferably, it should be made of aluminum or any alloy thereof, as long as is a good thermal conductor and allows the temperature sensor to be able to sense temperature at a major part of the housing.

Since the temperature sensor is coupled with the mounts provided in the APU housing and is suitable for detecting temperature under fire conditions, a critical temperature at the mounts or at any portion of the housing is detected before the integrity of the housing is in danger.

Thereby, in other aspect of this invention, an APU that complies with the safety requirement for APU is provided. Thus, since the invention detects fire before any loss of integrity occurs, the integrity of the APU is ensured. In this way, locating the sensors at the mounts or at theirs adjacencies, the invention enhances the security of the attachment of the APU in the event of a fire. As above mentioned, the invention avoids the need of any ancillary piece or reinforcement in any component of the APU that implies an undesirable addition of weight. Thus, the invention transforms a simple arrangement, where only a small portion of the housing attaches the APU, into a secure arrangement that meets the standards and requirements with a minimal weight, a particular critical issue in aircraft applications.

Additionally, in other aspect of this invention, an APU that performs a quicker fire detection in comparison with the existing fire detection system, is provided. This advantage is also achieved by locating the temperature sensor at the mounts, since the sensor monitories the area responsible for supporting the APU in first place.

BRIEF DESCRIPTION OF THE DRAWINGS

For a better comprehension of the invention the following drawings are provided for illustrative and non-limiting purposes, wherein:

FIG. 3 shows a schematic view of a gearbox housing of an APU, with a detail of an exploded view of its attachment to an external structure, according to another preferred embodiment.

FIG. 4 shows a schematic view of a gearbox housing of an APU with metallic pathways running along the housing according to another preferred embodiment.

DETAILED DESCRIPTION OF THE PREFERRED EMBODIMENTS

Figure 1:
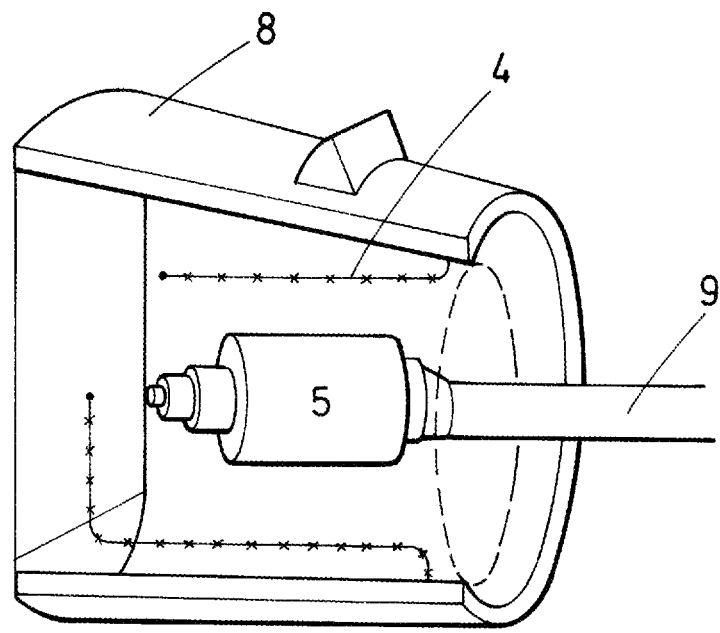
FIG. 1 shows a schematic perspective view of a prior art detector wiring routing around the APU compartment.
Figure 2:
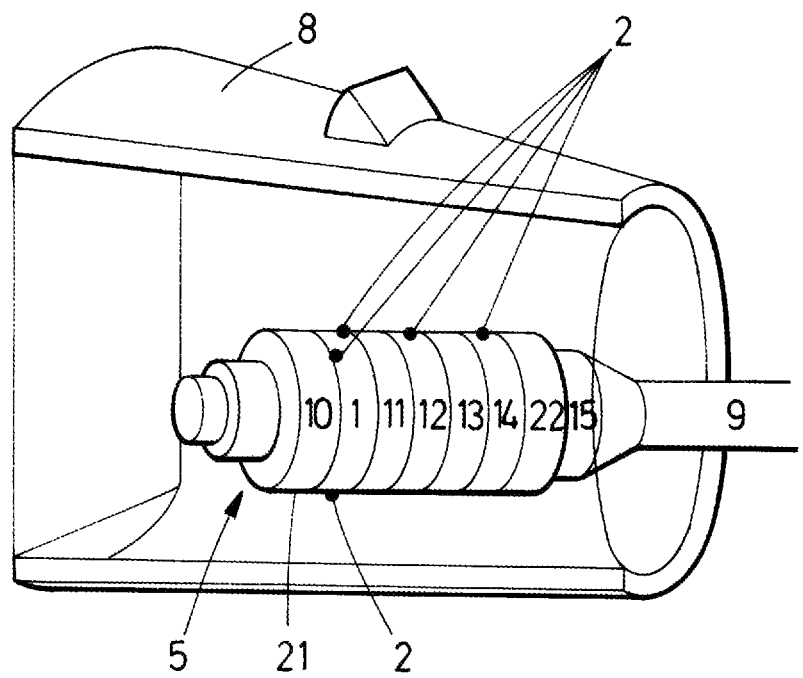
FIG. 2 shows a schematic perspective view of the APU housing, wherein the mounts have been indicated according to a preferred embodiment.

FIG. 2 depicts a housing 21 of an APU 5 placed in an APU compartment 8 whose parts have been detailed in order to indicate the preferred locations for the mounts 2. Conventionally, an APU 5 comprises an electrical generator, a gearbox, a load compressor, a plenum, a compressor, a combustion chamber, a turbine and an exhaust duct, at which the APU exhaust pipe is attached. According to a preferred embodiment, the APU housing 21 comprises a generator housing 10, a gearbox housing 1, a load compressor housing 11, a plenum housing 12, a compressor housing 13, a combustion chamber housing 14, a turbine housing 22 and an exhaust duct housing 15.

As shown, for attaching the APU 5 to its compartment 8, mounts 2 are preferentially provided both at the gearbox housing 1, at the plenum housing 12 and the combustion chamber housing 14. Since the combustion chamber housing 14 is initially designed as fireproof in its entirety for being able to withstand the high temperatures that reached inside, the gearbox housing 1 and the plenum housing 12 are the parts of the APU housing 21 that must be monitored to fulfilling with the fireproof APU certification requirement.

Thus, in a preferred embodiment, the APU 5 comprises a gearbox, and the APU housing 21 comprises a gearbox housing 1 that houses the gearbox, wherein the mounts 2 are placed in the gearbox housing 1.

In another preferred embodiment, the APU 5 comprises a plenum, and the APU housing 21 comprises a plenum housing 12 that houses the plenum, wherein the mounts 2 are placed in the plenum housing 12.

In the preferred embodiment of FIG. 3, it is shown a gearbox housing 1 of an APU 5 wherein three temperature sensors 3 are thermally coupled with mounts 2 of the gearbox housing 1, in order to sense temperature therein. As it can be seen, temperature sensors 3 are located adjacent to the proper mounts 2, since this is one of the preferred locations. Arranged at these locations, temperature sensors 3 sense temperature of an area, quite close to the critical areas responsible for supporting the APU, and at the same time avoid contact with the pieces received by the mounts 2 for attaching the gearbox housing 1 to an external structure.

FIG. 3 shows a detail of this attachment system in an exploded view. According to a preferred embodiment, the mounts 2 are configured to receive an attaching system which comprises brackets 16, suspension systems 17, nuts 18, rods 19 and lugs 20 for attaching the gearbox housing 1 to an external structure. Schematically, in the figure, the mounts 2 consist of threaded holes, but they could also comprise anchor holes, brackets, joints, knuckles or any other piece affixed, bolted or sealed to the gearbox housing 1.

On the other hand, in order to ensure that the temperature sensor 3 do not interfere with other APU components, the temperature sensor 3 can be inserted or embedded within the gearbox housing 1, which additionally would enhance the temperature sensing. As long as the temperature sensor 3 is able to sense and is located adjacent to the proper mounts 2, numerous locations are possible for locating the temperature sensor 3 at the gearbox housing 1.

The temperature sensor 3 is coupled with the mounts 2, preferentially, by means of screwed, piercing or pressure, and can be of any type whenever it is suitable for detecting temperature onto the gearbox housing material, under fire conditions. Preferentially, the temperature sensor 3 is a thermopair.

In the preferred embodiment of FIG. 3, the gearbox housing 1 of the APU comprises at least two mounts 2 provided at separated areas of the gearbox housing 1, where each mounts 2 have at least one temperature sensor 3, integrated therein. In this way, the APU of the present invention provides an enhanced fire detection system with a robust configuration in terms of operability, because if one of the sensors 3 fails, the others remain operative and available to keep sensing temperature.

Preferentially, the temperature sensor 3 is a dual temperature sensor so each temperature sensor 3 supplies two independent measures of temperature. This redundancy of the temperature sensor increases the robustness of the detection.

Conventionally, the housing 21 will be made of aluminum or an aluminum alloy, which is a good thermal conductor, but in the case of the housing 21 is made of another metallic material, that allows the temperature sensing, but with lower heat transfer coefficient, according to another embodiment, the APU may comprise at least one metallic pathway 6 running on the surface of the housing 21, extending from the mounts 2 towards an opposite area of the housing 21. These metallic pathways 6 are depicted in FIG. 4 wherein the housing 21 has been particularized to the gearbox housing 1. According to this embodiment, the invention envisages an improvement in the thermal conductivity of the housing 21 or to any integral part of the housing 1, if necessary.

Preferably, these metallic pathways 6 are lamina, mesh or cable and, preferably, are made of copper.

According to another preferred embodiment, each temperature sensor 3 is in communication with the electrical signal transducer that receives the detector wiring 4 signals. Preferentially, this communication is by wire but other means of communication could also be possible. The electrical signal transducer are configured to combine the electrical signals received from the temperature sensors 3 and from the detector wiring 4, to provide a common signal for feeding a fire detection unit, programmed for triggering a fire detection alarm when the temperature sensed exceeds a pre-established threshold. Integrating the temperature sensors 3 signals with the electrical signal transducer used by the detector wiring 4, a weight reduction is achieved, since the wire for connecting each temperature sensor 3 with the fire detection unit is avoided.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An auxiliary power unit for an aircraft comprising:
   a metallic housing having mounts for attaching the housing to an external structure,
   at least one temperature sensor suitable for detecting temperature under fire conditions,
   wherein said temperature sensor is coupled with a portion of the housing extending one third of the longer dimension of the housing from each mount for sensing temperature at the housing.

2. An auxiliary power unit according to claim 1, wherein the auxiliary power unit comprises a gearbox, and wherein the APU housing comprises a gearbox housing that houses the gearbox, wherein the temperature sensor is placed in the gearbox housing.

3. An auxiliary power unit according to claim 1, wherein the auxiliary power unit comprises a plenum, and wherein the APU housing comprises a plenum housing that houses the plenum, wherein the temperature sensor is placed in the plenum housing.

4. An auxiliary power unit according to claim 1, further comprising at least one metallic pathway running on a surface of the housing, and extending from a portion of the housing towards an opposite area of the housing, said portion of the housing extending one third of the longer dimension of the housing from each mount.

5. An auxiliary power unit according to claim 4, wherein the metallic pathway comprises a lamina.

6. An auxiliary power unit according to claim 4, wherein the metallic pathway comprises a mesh material.

7. An auxiliary power unit according to claim 4, wherein the metallic pathway comprises a cable.

8. An auxiliary power unit according to claim 1, further comprising at least two mounts provided at separated areas of the housing, each mount having at least one temperature sensor in a portion of the housing extending one third of the longer dimension of the housing from said mount.

9. An auxiliary power unit according to claim 1, wherein the temperature sensor is a dual temperature sensor.

10. An auxiliary power unit according to claim 1, wherein the temperature sensor is coupled with the housing by means of being screwed thereto.

11. An auxiliary power unit according to claim 1, wherein the temperature sensor is coupled with the housing by means of piercing.

12. An auxiliary power unit according to claim 1, wherein the temperature sensor is coupled with the housing by means of pressure.

13. An auxiliary power unit according to claim 1, wherein the housing is made of aluminum or an aluminum alloy.

* * * * *